United States Patent [19]

Beale et al.

[11] Patent Number: 5,400,256
[45] Date of Patent: Mar. 21, 1995

[54] FREQUENCY TRACKING ADAPTIVE SYNCHRONOUS VIBRATION SUPPRESSION APPARATUS

[75] Inventors: Stuart R. Beale, Boston; Peter J. LaRocca, Medford, both of Mass.

[73] Assignee: The Charles Stark Draper Laboratory, Inc., Cambridge, Mass.

[21] Appl. No.: 874,741

[22] Filed: Apr. 27, 1992

Related U.S. Application Data

[63] Continuation-in-part of Ser. No. 822,701, Jan. 21, 1992, Pat. No. 5,313,399.

[51] Int. Cl.[6] ............ H02K 7/09; G05B 19/02; G06F 15/332
[52] U.S. Cl. ................. 364/463; 364/508; 364/724.19; 364/148; 73/461
[58] Field of Search .............. 364/463, 508, 724.19, 364/726, 574, 576, 581, 148, 484; 73/461, 593, 579, 662, 672, 468, 472, 480, 481, 486, 462; 318/629; 324/76.21, 76.51

[56] References Cited

U.S. PATENT DOCUMENTS

3,955,426  5/1976  Klinchuch ................... 74/5.6 D
4,697,128  9/1987  Matsushita et al. ............ 318/607
4,910,449  5/1990  Hiyama et al. ............... 318/640
5,202,824  4/1993  Chen ......................... 364/508

Primary Examiner—Michael Zanelli
Attorney, Agent, or Firm—Iandiorio & Teska

[57] ABSTRACT

A frequency tracking adaptive synchronous vibration suppression apparatus for suppressing vibrations in a dynamic system subject to synchronous disturbance includes calculating the sine and cosine quadrature components of the energy representative of the synchronous component of the vibration induced by the synchronous disturbance; combining the sine and cosine quadrature components to obtain the energy representative of the synchronous component of the vibration; generating the Fourier coefficient portions of a correction command from the combination of the sine and cosine quadrature components; computing from the sine and cosine quadrature components and the Fourier coefficients the frequency of the synchronous components of the vibration; and modulating the Fourier coefficient portion of the correction command with the frequency of the synchronous components to obtain the full correction command tuned to the frequency of the synchronous disturbance.

14 Claims, 8 Drawing Sheets

FREQUENCY TRACKING ADAPTIVE SYNCHRONOUS VIBRATION SUPPRESSION APPARATUS

RELATED CASE

This invention is a continuation-in-part of U.S. patent application Ser. No. 07/822,701, entitled "Adaptive Synchronous Vibration Suppression Apparatus" by Stuart R. Beale, filed on Jan. 21, 1992, now U.S. Pat. No. 5,313,399.

FIELD OF INVENTION

This invention relates to a frequency tracking adaptive synchronous vibration suppression apparatus for suppressing vibration in a dynamic system subject to synchronous disturbance which can detect and suppress synchronous vibration over a full range of frequency of disturbances. In one application this invention relates to a frequency tracking adaptive forced balancing system for a rotor magnetic bearing suspension apparatus which uses the synchronous energy representative of the mass-unbalance to define the orbit of the geometric center to effectively rotate the rotor about its center of mass.

BACKGROUND OF INVENTION

Mass-unbalance in rotating machines acts as an undesirable synchronous disturbance at all operating frequencies. With the use of magnetic bearings as active control elements it is possible to adaptively compensate for mass-unbalance loading, thus eliminating vibration and fatigue in the support structure of the rotor.

There are two former methods of performing mass unbalance compensation. In conventional autobalancing a notch filter centered at the frequency of rotation is inserted in the control loop. Because of the notch filter, the control law has no gain at the frequency of rotation; hence, the bearings become "soft" at this frequency. No bearing force is generated, and the rotor pivots about its center of mass as if it were in free space. The second former method is a model-based balancing approach. Here an estimate of the mass-unbalance eccentricity is obtained by subtracting the output of a plant model or observer from the measured rotor position.

In conventional autobalancing the notch frequency is within or near the bandwidth of the control system (if the control system has a very low bandwidth balancing would be unnecessary). The disadvantage is that the stability margins of the system are severely degraded due to the phase lag contributed by the notch filter. Disturbance rejection properties near the notch frequency are also degraded. Furthermore, when the rotor spins through its critical speeds (i.e., bending modes) the notch filter must be disabled to avoid instability. Autobalancing is inappropriate for moving platform applications (e.g., jet engines) because such applications require high-bandwidth controllers and guaranteed stability margins.

Model-based balancing requires the implementation of an observer and may be sensitive to modeling errors. The disadvantage is that the balancing achieved can be only as good as the accuracy of the model used. With respect to magnetically suspended rotors, plant models tend to be nonlinear, high order, and at best crude approximations of reality.

Magnetic bearing suspension systems are but one environment in which unwanted dynamic vibrations occur. They can occur in any type of rotary system with any type of suspension apparatus. Moreover, dynamic vibrations, rotary or not, can occur in any kind of mechanical or acoustic environment. For example: environmental vibrations in a duct caused by a fan; unwanted vibrations in a vehicle seat caused by the vehicle engine.

More recently a third approach has been proposed which employs adaptive synchronous vibration suppression apparatus to suppress vibrations in a dynamic system subject to synchronous disturbances. This system detects the energy representative of the synchronous component of the vibration induced by a synchronous disturbance and generates a Fourier coefficient, amplitude and phase correction command. This command is then applied to an actuator to apply a force to the system to suppress the detected disturbance. In one application this approach has been used to eliminate vibrations in rotary machines by driving the magnetic bearings to define the orbit of the geometric center of the rotor to effect rotation of the rotor about its center of mass. Such an apparatus is disclosed in the parent U.S. patent application entitled "Adaptive Synchronous Vibration Suppression Apparatus" by Stuart R. Beale, cited above. One shortcoming with that apparatus is that it is designed to compensate for disturbances at a preselected frequency. If the frequency of the disturbance changes, the suppression is less than fully effective.

SUMMARY OF INVENTION

It is therefore an object of this invention to provide an improved frequency tracking adaptive synchronous vibration suppression apparatus for suppressing vibrations in a dynamic system subject to a synchronous disturbance.

It is a further object of this invention to provide such an improved frequency tracking adaptive synchronous vibration suppression apparatus for suppressing vibrations in a dynamic system subject to a synchronous disturbance which adapts easily to changes in frequency as well as in amplitude and phase of the vibrations.

It is a further object of this invention to provide such an improved frequency tracking adaptive synchronous vibration suppression apparatus for suppressing vibrations in a dynamic system subject to a synchronous disturbance which facilitates an improved frequency tracking adaptive forced balancing system for a rotor suspension apparatus.

It is a further object of this invention to provide such an improved frequency tracking adaptive forced balancing system for a rotor suspension apparatus using a magnetic bearing suspension apparatus.

It is a further object of this invention to provide such a frequency tracking adaptive forced balancing system which eliminates vibration due to mass-unbalance.

It is a further object of this invention to provide such a frequency tracking adaptive forced balancing system which compels the rotor geometric center to assume an orbit so that the rotor rotates about its center of mass rather than its geometric center.

It is a further object of this invention to provide such a frequency tracking adaptive forced balancing system which does not degrade the stability of the magnetic suspension.

It is a further object of this invention to provide such a frequency tracking adaptive forced balancing system which achieves balancing despite modeling errors, external disturbances, or sudden changes in system balances.

It is a further object of this invention to provide such a frequency tracking adaptive forced balancing system in which control energy is minimized by eliminating energy required to control unbalanced rotor position.

It is a further object of this invention to provide such a frequency tracking adaptive forced balancing system which is applicable independent of the use of the magnetic bearing suspension apparatus or the magnitude of the unbalance.

The invention results from the realization that a truly effective frequency tracking adaptive synchronous vibration suppression apparatus for suppressing vibrations in a dynamic system subject to synchronous disturbance can be achieved with a correction command tuned to the frequency of the synchronous disturbance derived from the sine and cosine quadrature components of the energy representative of the synchronous component of the vibration and the Fourier coefficients derived from the combination of those quadrature components, and that in keeping with this a more versatile forced balancing mechanism which eliminates vibration over a wide range of frequencies in rotating machines due to mass-unbalance can be achieved by detecting the synchronous energy representative of the mass-unbalance of the rotor and using that to define the orbit of the geometric center of the rotor to effect rotation of the rotor about its center of mass even though the frequency of the disturbance is not known or fixed. The invention can be applied to eliminate the source of a disturbance or to cancel the vibrational effects of it.

This invention features a frequency tracking adaptive synchronous vibration suppression apparatus for suppressing vibrations in a dynamic system subject to synchronous disturbance. There are means for calculating the sine and cosine quadrature components of the energy representative of the synchronous component of the vibration induced by a synchronous disturbance. There are also means for combining the sine and cosine quadrature components to obtain the energy representative of the synchronous component of the vibration, and means responsive to the means for combining for generating the Fourier coefficient portions of a correction command. There are means responsive to the sine and cosine quadrature components and to the Fourier coefficients for computing the frequency of the synchronous components of the vibration and means responsive to the frequency of the synchronous components for modulating the Fourier coefficient portion of the correction command to obtain the correction command tuned to the frequency of the synchronous disturbance.

In a preferred embodiment the means for computing may include a sine quadrature input channel having a first Fourier coefficient associated with it and a cosine quadrature input channel having a second Fourier coefficient associated with it, and a first switching means responsive to the polarity of the Fourier coefficients for selecting one input channel when the polarities are alike and the other input channel when the polarities are unlike. The means for computing may further include negative and positive output channels and second switching means for selecting one of the output channels when the Fourier coefficient associated with the selected input channel is equal to or greater than zero, and for selecting the other output channel when the Fourier coefficient associated with the selected input channel is less than zero. The means for computing may also include means for integrating the signal from the selected output channel to obtain the correction command. The first switching means may select the sine quadrature input channel when the polarities are unlike and the cosine quadrature input channel when the polarities are alike. The second switching means may select the positive output channel when the Fourier coefficient associated with the selected input channel is equal to or greater than zero, and the negative output channel when the Fourier coefficient associated with the selected input channel is less than zero. The means for modulating may include means responsive to the means for computing for producing a sine and a cosine function at the frequency of the synchronous components of the vibration. The means for modulating may also include means for multiplying the Fourier coefficient portions of the correction command with the sine and cosine functions, and means for summing the products of the means for multiplying to obtain the correction command.

The system also features a frequency tracking adaptive forced balancing system for a rotor suspension apparatus in which the sine and cosine quadrature components represent the energy of the synchronous component of the vibration induced by a mass unbalance of a rotor in a rotary machine, and the correction command is a position command tuned to the frequency of the synchronous disturbance induced by the mass-unbalance of the rotor and is used to define the orbit of the geometric center of the rotor to effect rotation of the rotor about its center of mass.

BRIEF DESCRIPTION OF THE DRAWINGS

Other objects, features and advantages will occur to those skilled in the art from the following description of a preferred embodiment and the accompanying drawings, in which.

DISCLOSURE OF PREFERRED EMBODIMENT

The adaptive synchronous vibration suppressor apparatus for suppressing vibration in a dynamic system subject to synchronous disturbance may be used in an adaptive forced balancing system for a rotor magnetic bearing suspension having a magnetic bearing control signal. The sine and cosine quadrature components of the energy representative of the synchronous component of the vibration induced by the mass-unbalance of the rotor is calculated. Then those sine and cosine quadrature components are combined to obtain the energy representative of the synchronous component of the vibration induced by the mass-unbalance of the rotor. The Fourier coefficient portion of a synchronous position correction command is then generated from the combined quadrature components, after which the sine and cosine quadrature components and the Fourier coefficients are used to compute the frequency of the synchronous component of the vibration induced by the mass-unbalance of the rotor. The Fourier coefficient component of the synchronous correction command is then modulated by the frequency of the synchronous component of the vibration to obtain a synchronous position correction command tuned to the frequency of the synchronous disturbance induced by the mass-unbalance of the rotor.

Figure 1:
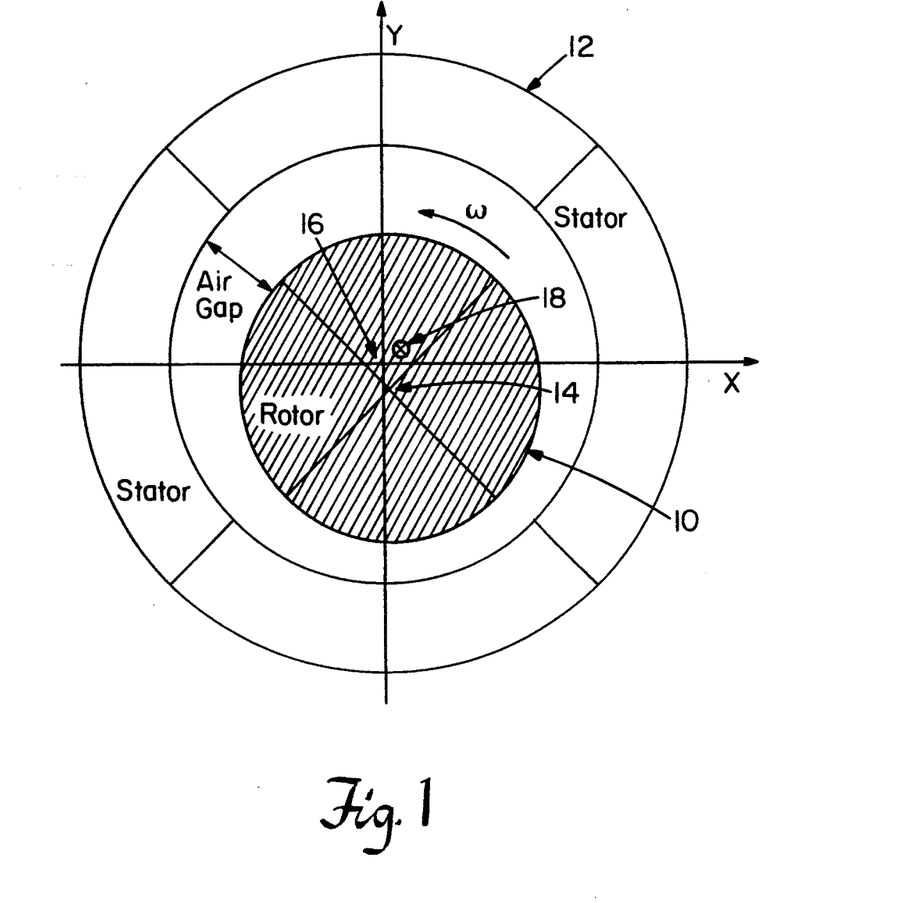
FIG. 1 is a schematic end view of a magnetic rotor bearing illustrating the geometric centers of the rotor and stator and the center of mass of the rotor.

There is shown in FIG. 1 a rotor 10 rotatable relative to stator 12 suspended by means of magnetic bearings relative to stator 12. By the use of the magnetic bearings, rotor 10 can be positioned to rotate anywhere within stator 12; preferably it is centered so that the geometric center 14 of rotor 10 is at the geometric center 16 of stator 12. However, in some cases, even when the two centers 14 and 16 are aligned for rotation there is vibration due to mass-unbalance in the rotor as a result of manufacturing deficiencies or damage to the rotor during installation or operation.

This invention tracks the frequency of the vibration and adjusts the orbit of geometric center 14 so that rotation occurs about the true center of mass 18 of rotor 10 regardless of whether the frequency is known or varying.

Figure 2:
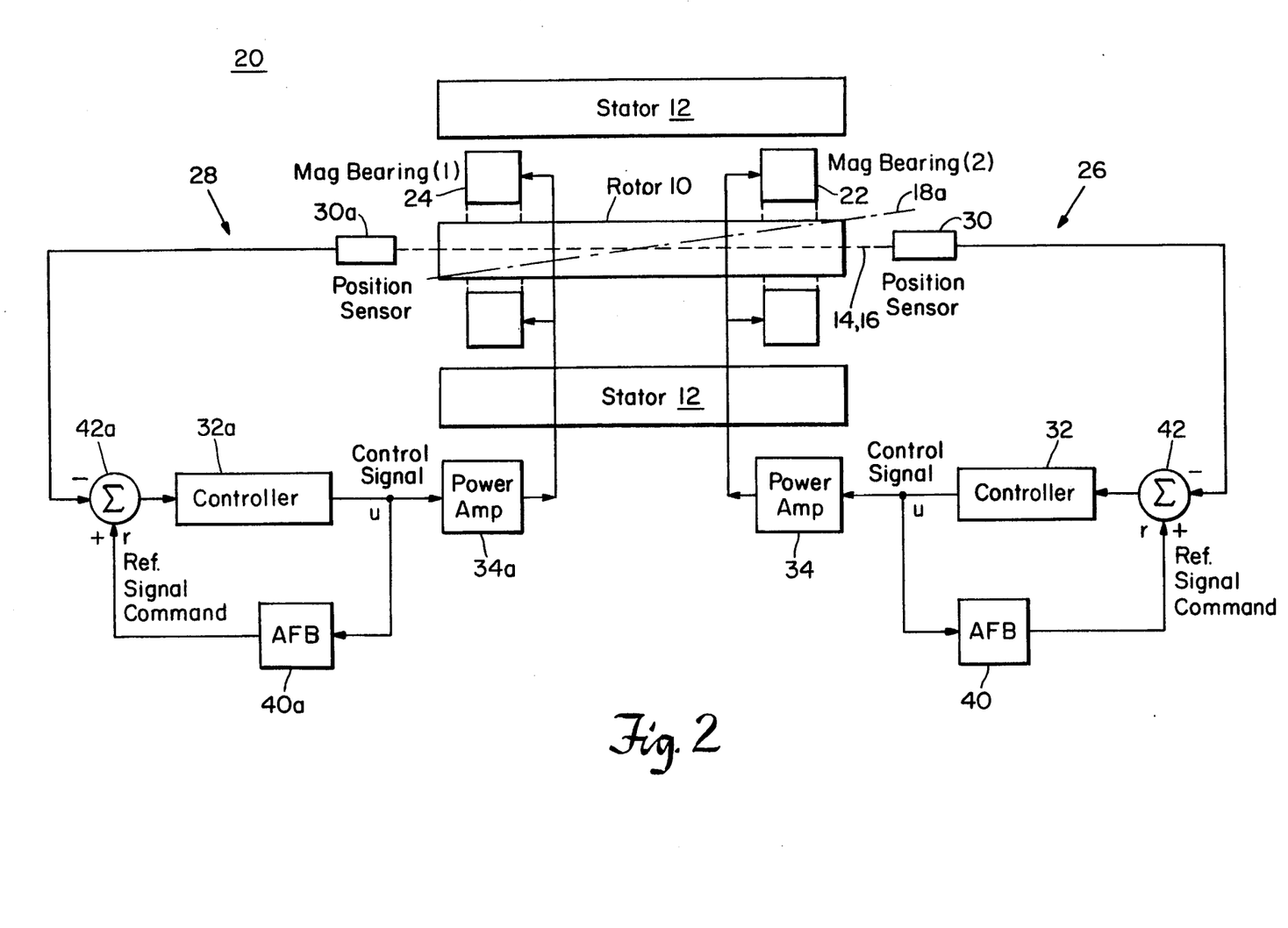
FIG. 2 is a schematic block diagram of a magnetic bearing suspension apparatus including two magnetic bearings with their control systems and including the frequency tracking adaptive forced balancing system according to this invention for controlling the orbit of the geometric centers to compel the rotor to rotate about its axis of inertial mass, thereby eliminating the source of the vibration.

In a conventional machine 20, FIG. 2, there are a pair of magnetic bearings 22 and 24 each having associated with it a magnetic bearing suspension apparatus 26 and 28, respectively. Magnetic bearing suspension apparatus 26 includes a sensor 30 for sensing the position of rotor 10 with respect to stator 12. The output from position sensor 30 drives controller 32 to produce a control signal to amplifier 34 which drives bearing 22. Magnetic bearing suspension apparatus 28 includes similar parts which have been given like numbers accompanied by a lower case a. By connecting the center of mass positions along the entire length of rotor 10a, the principal axis of inertia 18a is defined. It is this axis about which rotation is achieved. To do so, the geometric axis 14 is made to define an orbital path as follows.

An adaptive forced balancing system 40 and 40a is used in conjunction with controllers 32 and 32a, respectively. The output from controller 32, the control signal, is fed back to the adaptive forced balancing system 40 to generate a position correction command, reference signal r, or position command which is combined in summer 42 with the signal from position sensor 30 to provide a modified signal to controller 32. Adaptive forced balancing system 40a operates in the same fashion.

Figure 3:
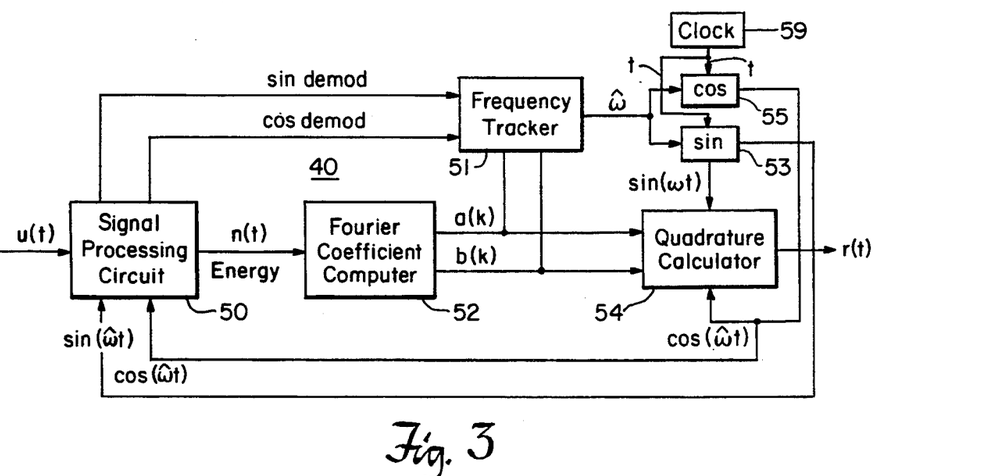
FIG. 3 is a more detailed block diagram of the frequency tracking adaptive forced balancing system of FIG. 2.

Adaptive forced balancing system 40 is shown in greater detail in FIG. 3 as including a signal processing circuit 50 that receives the control signal u(t) and provides an output signal n(t), which is the energy representative of the mass-unbalance of rotor 10. The energy signal n(t) is submitted to a Fourier coefficient computer 52 which generates Fourier coefficients a(k) and b(k). The coefficient terms a(k) and b(k) are used to generate the Fourier quadrature terms in calculator 54 and combined to produce the position reference command r(t).

In accordance with this invention signal processing circuit 50 which receives $\sin(\hat{\omega}t)$ and $\cos(\hat{\omega}t)$ inputs also provides the quadrature components, sine demodulated and cosine demodulated outputs to frequency tracker 51. Frequency tracker 51 combines these components "sine demod" and "cosine demod" with Fourier coefficients a(k) and b(k) to obtain the signal $\hat{\omega}$ which represents an estimate of the frequency of the synchronous component of the vibration. The $\hat{\omega}$ signal is delivered to sine and cosine generators 53, 55 responsive to clock 59, which introduce the $\sin(\hat{\omega}t)$ and $\cos(\hat{\omega}t)$ signals to quadrature calculator 54 which in turn uses them to modulate Fourier coefficient a(k) and b(k) to obtain the synchronous position command r(t).

Figure 4:
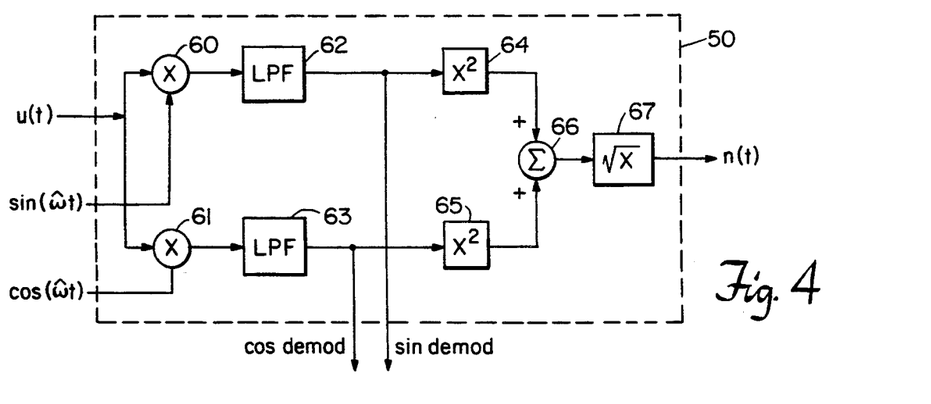
FIG. 4 is a more detailed block diagram of the signal processing circuit of FIG. 3.
Figure 5:
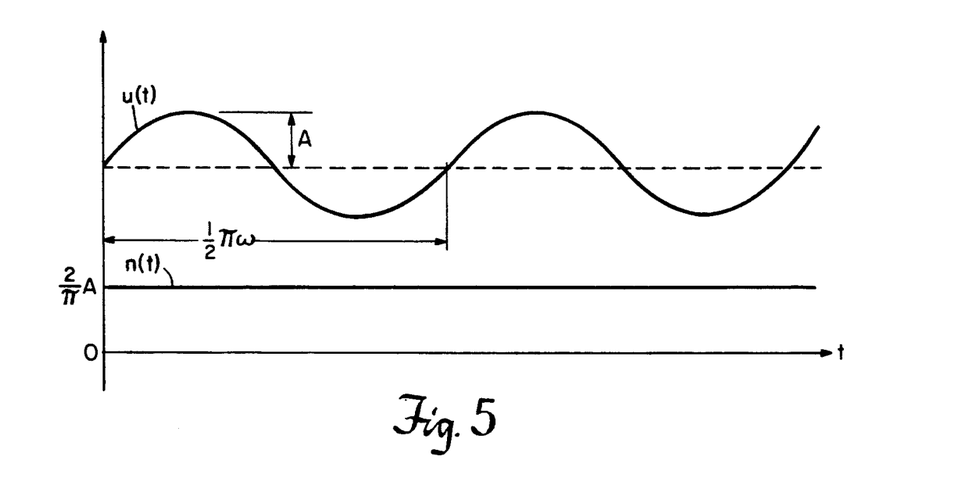
FIG. 5 illustrates a plurality of waveforms which occur in FIGS. 3 and 4.

Signal processing circuit 50, FIG. 4, includes a pair of multipliers 60, 61 which combine control signal u(t) and the $\sin(\hat{\omega}t)$ and $\cos(\hat{\omega}t)$ signals respectively, and pass those quadrature components to low pass Bessel filters 62, 63 which produce the sine demod and cosine demod signals that are delivered to frequency tracker circuit 51. These same signals are combined by squaring circuits 64, 65, summer 66 and square root circuit 67 to produce the signal n(t) representative of the energy of the synchronous component of the vibration. The n(t) and u(t) signals are represented in FIG. 5.

Figure 6:
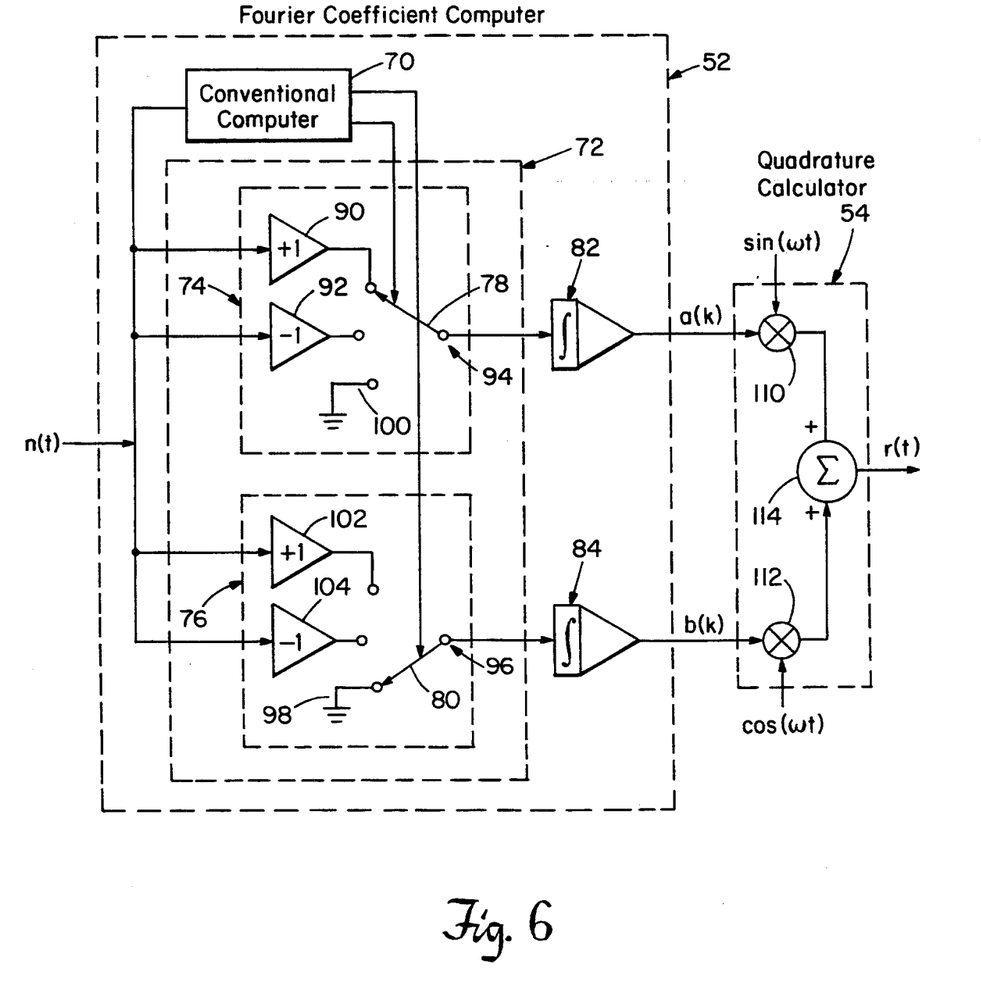
FIG. 6 is a more detailed schematic diagram of the Fourier coefficient computer and the quadrature calculator of FIG. 3.

Fourier coefficient computer 52 and quadrature calculator 54 are shown in greater detail in FIG. 6. Fourier coefficient computer 52 includes a conventional computer 70 such as an IBM PC, which receives the synchronous energy signal n(t) and determines whether it is increasing or decreasing, whether it is concave facing upward or downward, and whether a local extremum, that is a maximum or a minimum, is occurring with respect to the synchronous signal n(t).

Computer 70 drives switching means 72 which has two sections 74 and 76, each of which is in a separate channel 78 and 80, respectively. Channel 78 includes an integrator 82 which integrates the output from switching section 74 to provide the Fourier coefficient a(k). Channel 80 includes integrator 84 which integrates the output from switch section 76 to create Fourier coefficient b(k). Assuming as shown that channel 78 is enabled and channel 80 is disabled, then switching section 74 is set so that either the +1 amplifier 90 output or the −1 amplifier 92 output is connected to line 94. In that case, line 96 of channel 80 is connected to the ground or zero terminal 98. As long as the synchronous energy signal n(t) is decreasing or is shaped concavely downward, computer 70 keeps the connection to +1 amplifier 90. However, if the signal n(t) is increasing and is concave upward, computer 70 connects line 94 to the −1 amplifier 92. Further, if the signal n(t) is increasing and shaped concavely upward and there is a local extremum occurring, that is, a maximum or minimum, then computer 70 switches line 94 to the ground terminal 100 of switch section 74 and switches line 96 of channel 80 away from its ground terminal 28 to either its plus 102 or minus 104 amplifiers and the operation then continues with the output on channel 80 while channel 78 is constant. The outputs a(k) from integrator 82 and b(k) from integrator 84 are submitted to multipliers 110, 112 which multiply the coefficients by sin(ωt) and cos(ωt) respectively, to obtain the Fourier quadrature terms, which are then combined in summer 114 to obtain the position reference command r(t).

Figure 7:
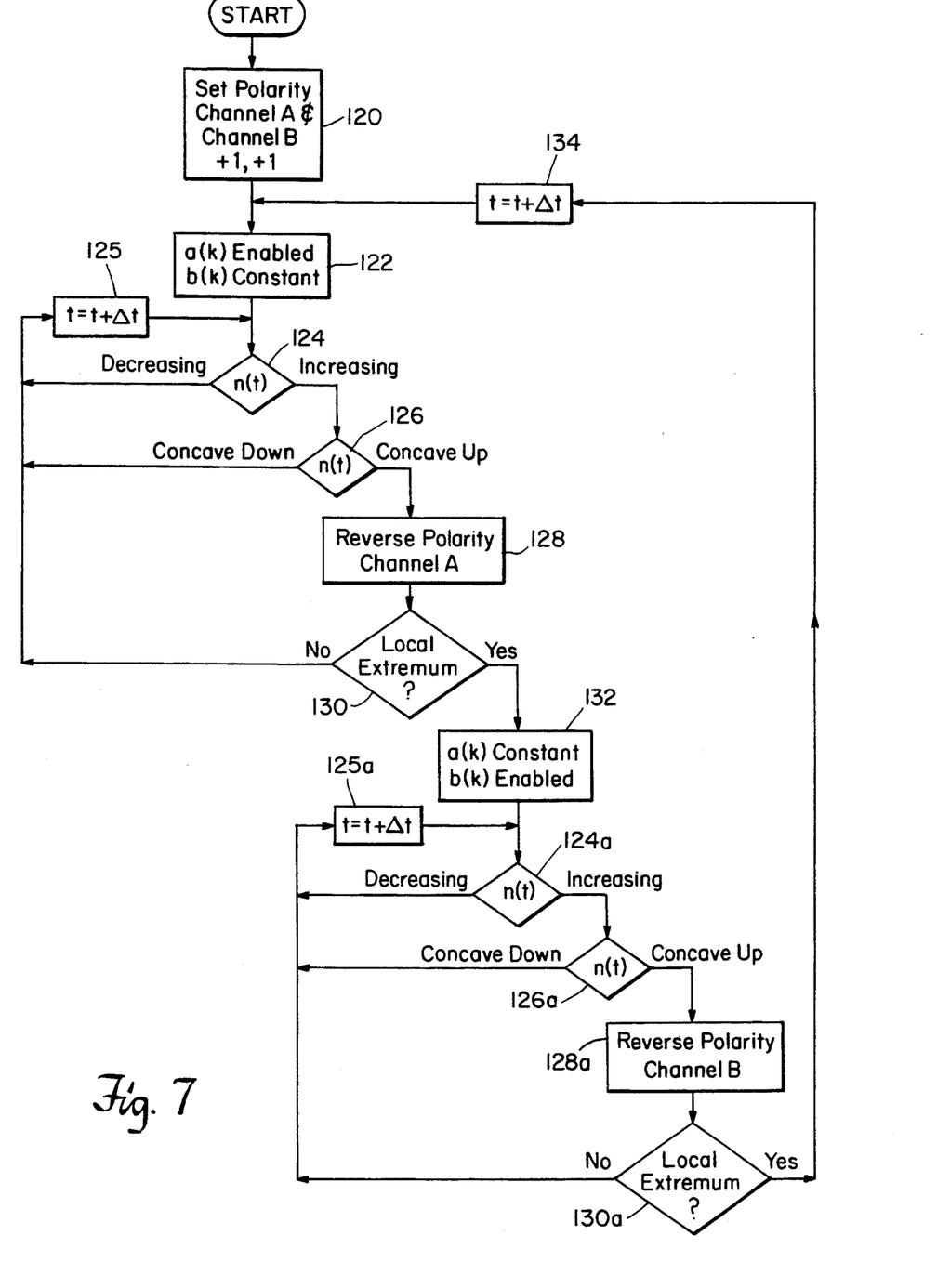
FIG. 7 is a flow chart of the software used to operate the switching sections in FIG. 6.
Figure 8:
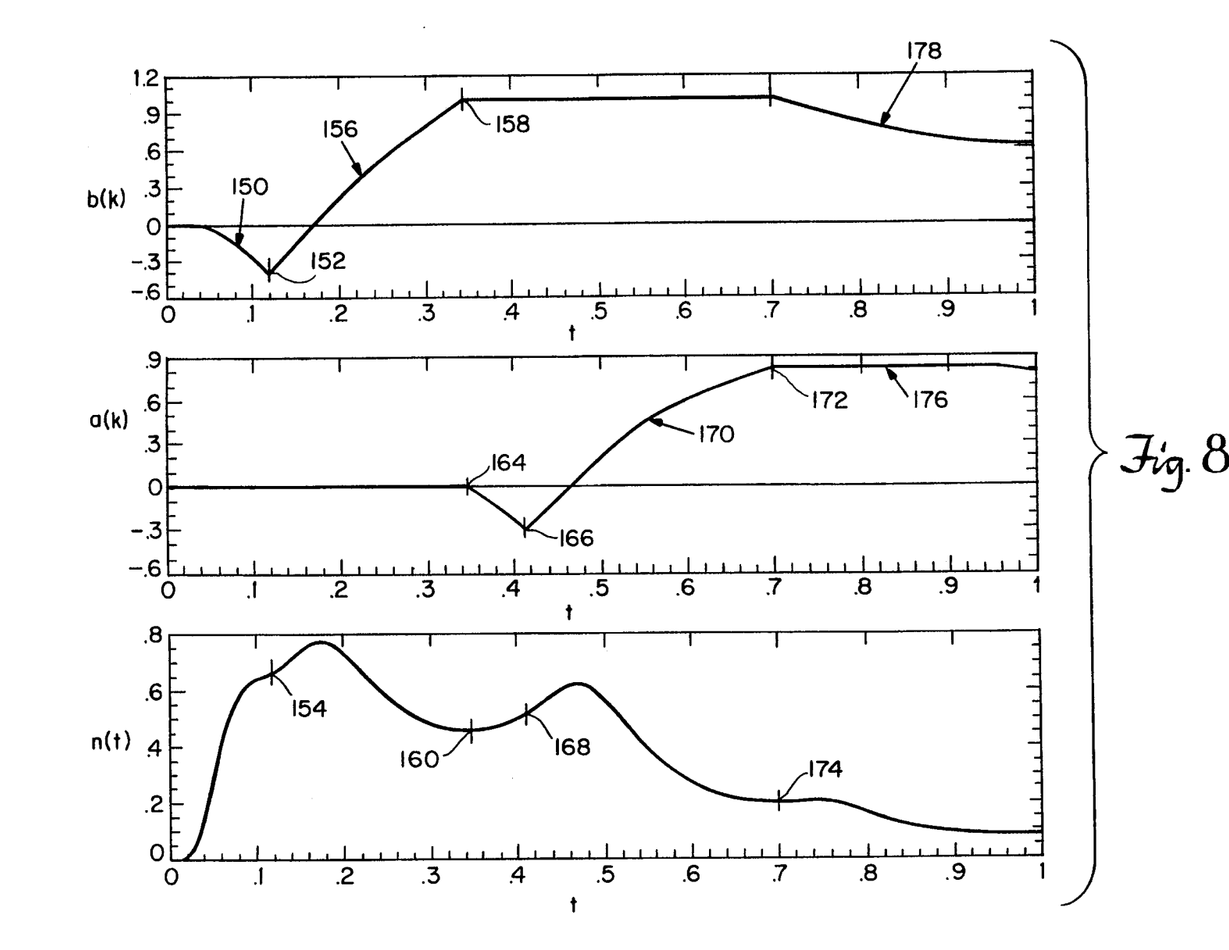
FIG. 8 illustrates the energy signal n(t) and the Fourier coefficients a(k), b(k) resulting therefrom.

The function of computer 70 and switching circuit 72 is explained further with respect to FIG. 7, where the polarity of each of switching sections 74 and 76 is initially set to either +1 or −1 in step 120. In the initial step 120, in each channel one of the amplifiers, either the +1 or the −1, is selected. Following this in step 122, one of the channels is enabled and one is disabled. In this case, channel A is enabled so that channel B is disabled or held constant, as indicated by the position of line 96 interconnected with the ground terminal 98 in FIG. 6. Following this, the inquiry is made by computer 70 as to whether the synchronous energy signal n(t) is increasing or decreasing. If it is decreasing, step 124, the system simply cycles back through timing step 126 and revisits step 124. If in response to the inquiry in step 124 it is determined that the synchronous energy signal n(t) is increasing, then a further inquiry is made in step 126 as to whether the curve presently has a shape which is concave downwardly or concave upwardly. If it is concave downwardly the system returns through timer 125 to step 124. If it is concave upwardly, then in step 128 the polarity is reversed in switch section 74, that is, line 94 is disconnected from the plus amplifier 90 and reconnected to the minus amplifier 92. The implication when the waveform is increasing and facing concave up is that the error or divergence is increasing so the action taken is to reverse the polarity in step 128. If it is further determined in step 130 that there is a local extremum occurring, that is, either a maxima or minima, then a further corrective operation is undertaken in step 132, whereby channel 78 is put into the constant condition and channel 80 is enabled or made operative. If the extremum is a maxima, the present value must be greater than the maxima, and if the extremum is a minima then the present value must be greater than the minima. In that case line 96 is connected to −1 amplifier 104 and line 94 is connected to the ground terminal 100. Now the same subroutine is accomplished with respect to channel 80 for the calculation of Fourier coefficient b(k) and like steps have been given like numbers accompanied by a lower case a. After step 130a, the system returns through third timer 134 and re-enters step 122, where channel 78 is once again enabled to calculate Fourier coefficient a(k) and channel 80 is disabled so that the Fourier coefficient b(k) is kept constant. The effect of this can be seen in FIG. 8, where the Fourier coefficient a(k) begins the downward trend 150 until point 152, where the synchronous energy curve n(t) has an increasing value and is facing concave up at point 154. From that point onward, a(k) switches direction and moves generally upward in a positive direction as indicated in area 156. Subsequently, at point 158 coefficient a(k) levels off and becomes constant. That is the point at which n(t) is showing not only an increasing signal which is concave upward, but also local extremum point 160. It is at this point that the computer 70 flips switch sections 74 and 76 so that line 94 connects with ground terminal 100 and the output a(k) becomes constant in the region 162 while at the same time switch section 76 has its line 96 move to the −1 amplifier 104, enabling channel 80. At this point 164 b(k) begins a downward trend and maintains that until point 166, where signal n(t) displays an increasing concave up shape at point 168. At that point, signal b(k) begins a positive upward trend as shown at region 170, which it continues up to a point 172, where signal n(t) has once again undergone an increasing concave upward trend along with a local extremum at 174. This causes the computer 70 to once again swap the condition of switch sections 74 and 76 so that 80 is now switched back to ground terminal 98 and b(k) experiences a constant output shown in region 176, while coefficient a(k) begins a decreasing output value in region 178.

Figure 9:
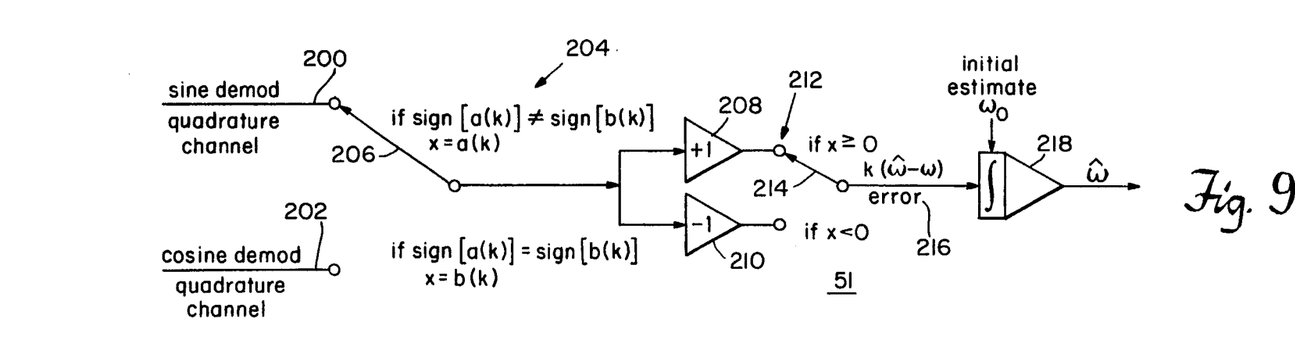
FIG. 9 is a more detailed schematic diagram of the frequency tracker of FIG. 3.

Frequency tracker circuit 51 may be implemented by a switching circuit as shown in FIG. 9, where the sine demod signal and cosine demod signal are delivered on lines 200 and 202 to switch 204. If the sign of the Fourier coefficient u(t) is not equal to the sign of b(t) then output line 206 of switch 204 is connected to the sine demod line or channel and a(t) is selected as the test Fourier coefficient for second switch section 212. If the sign of a(t) is equal to the sign of b(t), then channel 206 will be connected to channel 202 and b(t) is selected as the test Fourier coeffient for second switch section 212. Whichever orientation is assumed by channel 206, the output signal is delivered to a pair of amplifiers: amplifier 208 which multiplies the signal by a +1, and amplifier 210 which amplifies the signal by a −1. The outputs of these two amplifiers are then delivered to second switch 212 whose output channel 214 is connected to amplifier 208 if the value of the test Fourier coefficient is equal to or greater than zero, and is connected to amplifier 210 if the test Fourier coefficient is less than zero. This signal, presented on line 216, constitutes the error signal $k(\hat{\omega}-\omega)$ which is delivered to integrating circuit 218 that combines the error signal with the initial estimate, $\omega_o$, to obtain the $\hat{\omega}$ output.

Figure 10:
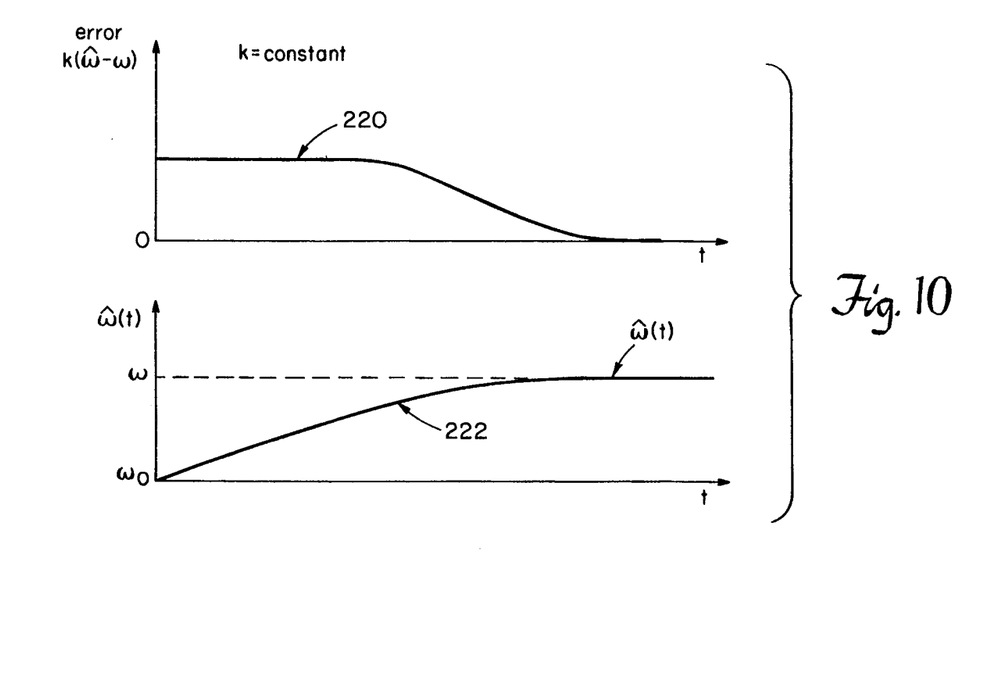
FIG. 10 is an illustration of the frequency and frequency error signals generated by the frequency tracker of FIG. 9.
Figure 11:
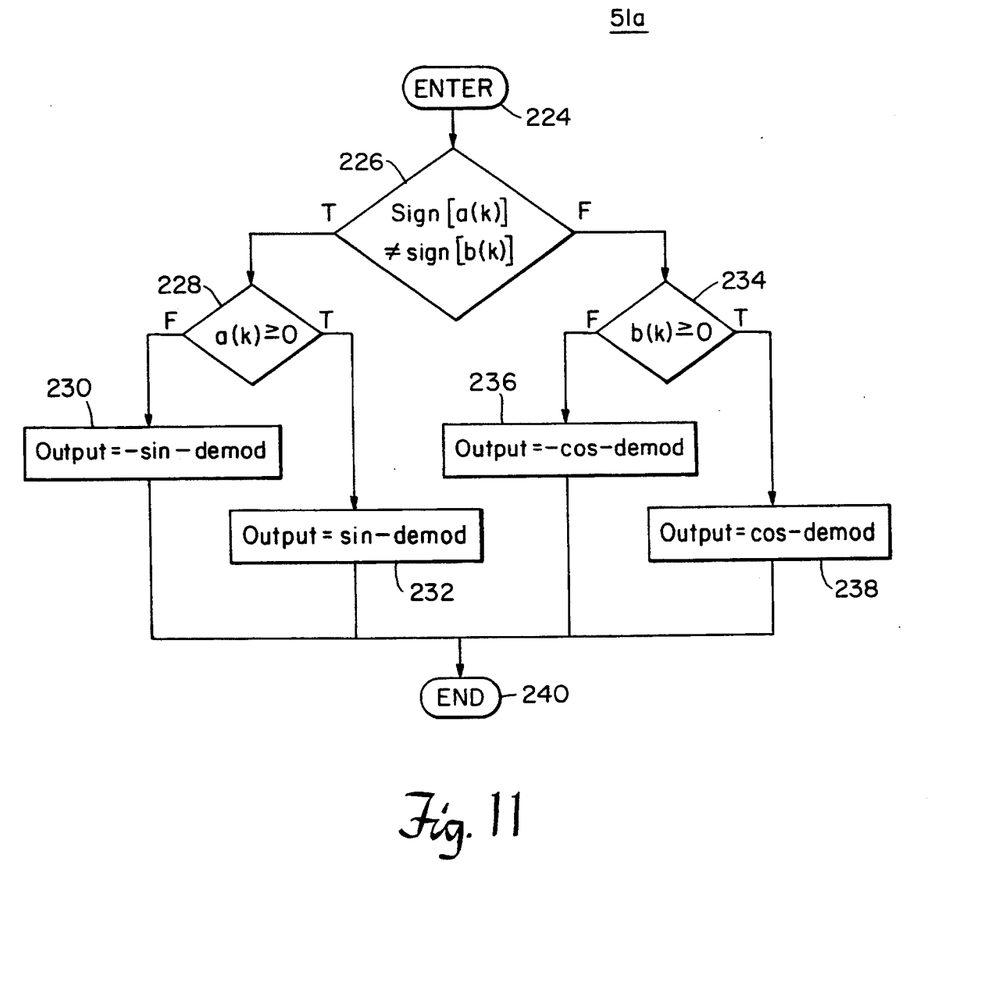
FIG. 11 is a flow chart of the software that may be used to operate a microprocessor implementation of the frequency tracker of FIG. 3.

The error signal $k(\hat{\omega}-\omega)$ 220, FIG. 10, thus gradually decreases to zero while the ω(t) signal 222 gradually increases to the value ω. Frequency tracker 51 may also be implemented by software 51a, FIG. 11, utilized in a microprocessor such as a Texas Instrument TMS320C30. In that case, after entering the routine in step 224, the system seeks, step 226, to determine whether the signs of the Fourier coefficients are unlike. If they are unlike, then the further inquiry is made in step 228 to determine whether the Fourier coefficient a(k) is equal to or greater than zero. If it is not, then in step 230 there is generated the output, which is the error signal 26 of FIG. 9, as -sine demod. If the coefficient a(k) is equal to or greater than zero, then in step 232 there is generated the output as sine demod. If in step 226 it is found that the two Fourier coefficients do not have unlike signs, that is, they are of the same sign, then in step 234 inquiry is made as to whether the Fourier coefficient b(k) is equal to or greater than zero. If it is not, there is generated in step 236 the output as -cosine demod. If in fact in step 234 the Fourier coefficient b(k) is found to be equal to or greater than zero, then in step 238 there is generated the output as cosine demod. With any one of these four outputs the routine comes to an end in step 240.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A frequency tracking adaptive synchronous vibration suppression apparatus for suppressing vibrations in a dynamic system subject to synchronous disturbance, comprising:

means, responsive to a vibration signal indicative of a synchronous disturbance, for calculating the sine and cosine quadrature components of the energy representative of the synchronous components of the vibration induced by a synchronous disturbance;

means for combining the sine and cosine quadrature components to obtain the energy representative of the synchronous component of the vibration;

means, responsive to said means for combining, for generating Fourier coefficient portions of a correction command;

means, responsive to said sine and cosine quadrature components and to said Fourier coefficients, for computing the frequency of the synchronous component of the vibration; and means, responsive to the frequency of the synchronous component, for modulating the Fourier coefficient portions of the correction command to obtain a correction command tuned to the frequency of the synchronous disturbance for suppressing vibrations in the dynamic system.

2. The synchronous vibration suppression system of claim 1 in which said means for computing includes a sine quadrature input channel having a first Fourier coefficient associated with it and a cosine quadrature input channel having a second Fourier coefficient associated with it, and first switching means responsive to the polarity of the Fourier coefficients for selecting one input channel when the polarities are alike and the other input channel when the polarities are unlike.

3. The synchronous vibration suppression system of claim 2 in which said means for computing includes negative and positive output channels, and second switching means for selecting one of said output channels when the Fourier coefficient associated with the selected input channel is equal to or greater than zero and for selecting the other output channel when the Fourier coefficient associated with the selected input channel is less than zero.

4. The synchronous vibration suppression system of claim 3 in which said means for computing includes means for integrating a signal from the selected output channel to obtain the tuned correction command.

5. The synchronous vibration suppression system of claim 2 in which said first switching means selects said sine quadrature input channel when said polarities are unlike and the cosine quadrature input channel when said polarities are alike.

6. The synchronous vibration suppression system of claim 3 in which said second switching means selects said positive output channel when the Fourier coefficient associated with the selected input channel is equal to or greater than zero and the negative output channel when the Fourier coefficient associated with the selected input channel is less than zero.

7. The synchronous vibration suppression system of claim 1 in which said means for modulating includes means, responsive to said means for computing, for producing a sine and a cosine function at the frequency of the synchronous components of the vibration; means for multiplying the Fourier coefficient portions of the correction command with said sine and cosine functions, and means for summing the products of said means for multiplying to obtain said tuned correction command.

8. A frequency tracking adaptive forced balancing system for a rotor suspension apparatus, comprising:

means, responsive to a vibration signal indicative of a synchronous rotor disturbance, for calculating the sine and cosine quadrature components of the energy representative of the synchronous component of the vibration induced by the mass-unbalance of the rotor;

means for combining the sine and cosine quadrature components to obtain the energy representative of the synchronous component of the vibration induced by the mass-unbalance of the rotor;

means, responsive to said means for combining, for generating Fourier coefficient portions of a position correction command;

means, responsive to said sine and cosine quadrature components and to said Fourier coefficients, for computing the frequency of the synchronous components of the vibration induced by the mass-unbalance of the rotor; and means, responsive to the frequency of the synchronous components, for modulating the Fourier coefficient portions of the position correction command to obtain a position correction command tuned to the frequency of the synchronous disturbance induced by the mass-unbalance of the rotor for suppressing vibrations of the rotor.

9. The system of claim 8 in which said means for computing includes a sine quadrature input channel having a first Fourier coefficient associated with it and a cosine quadrature input channel having a second Fourier coefficient associated with it, and first switching mean responsive to the polarity of the Fourier coefficients for selecting one input channel when the polarities are alike and the other when the polarities are unlike.

10. The system of claim 9 in which said means for computing includes negative and positive output channels, and second switching means for selecting one of said output channels when the Fourier coefficient associated with the selected input channel is equal to or greater than zero and for selecting the other output channel when the Fourier coefficient associated with the selected input channel is less than zero.

11. The system of claim 10 in which said means for computing includes means for integrating a signal from the selected output channel to obtain the tuned position correction command.

12. The system of claim 9 in which said first switching means selects said sine quadrature input channel when said polarities are unlike and the cosine quadrature input channel when said polarities are alike.

13. The system of claim 10 in which said second switching means selects said positive output channel when the Fourier coefficient associated with the selected input channel is equal to or greater than zero and the negative output channel when the Fourier coefficient associated with the selected input channel is less than zero.

14. The system of claim 8 in which said means for modulating includes means, responsive to said means for computing, for producing a sine and a cosine function at the frequency of the synchronous components of the vibration; means for multiplying the Fourier coefficient portions of the position correction command with said sine and cosine functions, and means for summing the products of said means for multiplying to obtain said tuned position correction command.

* * * * *